US012579310B2

(12) United States Patent
Rosenbaum et al.

(10) Patent No.: US 12,579,310 B2
(45) Date of Patent: Mar. 17, 2026

(54) ANONYMIZATION OF DATA

(71) Applicant: Siemens Healthineers AG, Forchheim (DE)

(72) Inventors: Ute Rosenbaum, Kempten (DE); Jorge Ricardo Cuellar Jaramillo, Baierbrunn (DE)

(73) Assignee: Siemens Healthineers AG, Forchheim (DE)

( * ) Notice: Subject to any disclaimer, the term of this patent is extended or adjusted under 35 U.S.C. 154(b) by 122 days.

(21) Appl. No.: 18/412,742

(22) Filed: Jan. 15, 2024

(65) Prior Publication Data

US 2024/0241987 A1 Jul. 18, 2024

(30) Foreign Application Priority Data

Jan. 17, 2023 (EP) ..................................... 23152043

(51) Int. Cl.
G06F 21/62 (2013.01)

(52) U.S. Cl.
CPC ................................. G06F 21/6254 (2013.01)

(58) Field of Classification Search
CPC .................................................. G06F 21/6254
See application file for complete search history.

(56) References Cited

U.S. PATENT DOCUMENTS

| 2023/0045533 A1* | 2/2023 | Suppan | ................... | G16H 10/60 |
| 2023/0054446 A1* | 2/2023 | LaFever | ................ | H04W 12/75 |
| 2023/0058906 A1* | 2/2023 | Jansen | ................ | G06F 21/6254 |
| 2023/0148326 A1* | 5/2023 | Papel | .................... | G06F 21/602 |
| | | | | 726/26 |
| 2023/0195921 A1* | 6/2023 | Yu | ........................ | G06F 21/6218 |
| | | | | 726/26 |
| 2023/0267230 A1* | 8/2023 | Delvaux | ............... | H04W 12/02 |
| | | | | 726/26 |
| 2023/0418977 A1* | 12/2023 | Bennati | ................. | H04W 4/021 |

(Continued)

OTHER PUBLICATIONS

Byun, Ji-Won et al: "Secure Anonymization for Incremental Datasets"; Jan. 1, 2006 (Jan. 1, 2006); Secure Data Management Lecture Notes in Computer Science; LNCS, Springer, Berlin, DE, pp. 48-63; XP019040079; ISBN: 978-3-540-38984-2.

(Continued)

*Primary Examiner* — Stephen T Gundry
(74) *Attorney, Agent, or Firm* — Harness, Dickey & Pierce, P.L.C.

(57) ABSTRACT

A computer-implemented method for anonymizing data via generalization, wherein the data includes a first number of first datasets at a first time point and a second number of second datasets at a second time point. The first datasets are a subset of the second datasets. The computer-implemented method comprises: generating a first generalization for the first datasets that fulfills a required anonymization, wherein the first generalization includes a first group of assignment ranges by which values of a quasi-identifier of the data are generalized; and generating a second generalization for the second datasets that fulfills the required anonymization, wherein the second generalization includes a second group of assignment ranges by which values of the quasi-identifier are generalized. The second group includes more assignment ranges than the first group.

20 Claims, 5 Drawing Sheets

(56)                    References Cited

U.S. PATENT DOCUMENTS

| | | | |
|---|---|---|---|
| 2024/0005035 A1* | 1/2024 | Guillaudeux | G06F 21/602 |
| 2024/0005175 A1* | 1/2024 | Jensen | G06N 5/01 |
| 2024/0020415 A1* | 1/2024 | Zhang | G06F 21/6254 |
| 2024/0070323 A1* | 2/2024 | Zhang | G06F 21/6254 |
| 2024/0070324 A1* | 2/2024 | Cuellar Jaramillo | G06F 21/6245 |
| 2024/0078253 A1* | 3/2024 | Hawco | G06N 7/01 |
| 2024/0095385 A1* | 3/2024 | Dhouib | G06F 21/6254 |
| 2024/0119175 A1* | 4/2024 | Middleton | G06N 3/0895 |
| 2024/0143838 A1* | 5/2024 | Ardhanari | G16H 30/40 |
| 2024/0160965 A1* | 5/2024 | Goldsteen | G06N 5/045 |
| 2024/0249024 A1* | 7/2024 | Furukawa | G06F 21/62 |
| 2025/0053686 A1* | 2/2025 | Wu | G06F 21/6254 |
| 2025/0103638 A1* | 3/2025 | Dou | G06F 16/355 |
| 2025/0124169 A1* | 4/2025 | Di Valentino | G06F 21/6254 |
| 2025/0209205 A1* | 6/2025 | Tsuchida | G06F 21/6254 |

OTHER PUBLICATIONS

Di Gesu, Vito et al: "An Application of Integrated Clustering to MRI Segmentation"; Pattern Recognition Letters, Elsevier, Amsterdam, NL; vol. 15; No. 7; Jul. 1, 1994 (Jul. 1, 1994); pp. 731-738; XP000453039; ISSN: 0167-8655; DOI: 10.1016/0167-8655(94)90078-7.

* cited by examiner

FIG 4
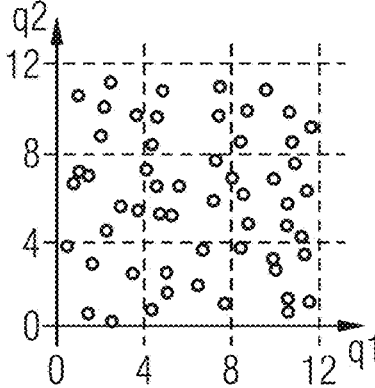 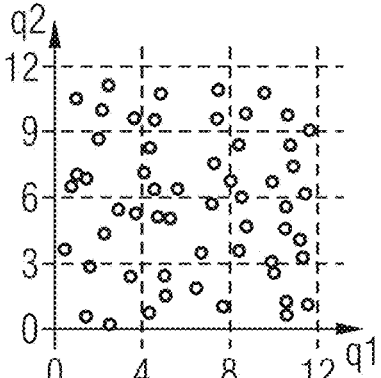 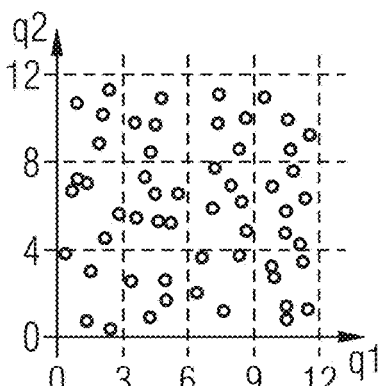
FIG 5

ANONYMIZATION OF DATA

CROSS-REFERENCE TO RELATED APPLICATION (S)

The present application claims priority under 35 U.S.C. § 119 to European Patent Application No. 23152043.8, filed Jan. 17, 2023, the entire contents of which is incorporated herein by reference.

TECHNICAL FIELD

One or more example embodiments of the present invention relate to methods and devices for anonymizing data. One or more example embodiments of the present invention relate in particular to a computer-implemented method for anonymizing data via generalization, as well as to a corresponding device.

BACKGROUND

Anonymization relates to the modification of personal data in such a way that said data can no longer be attributed to an identified or identifiable natural person or can be so only with a disproportionately large investment of time, costs and physical effort.

In this description, independent of the grammatical term usage, individuals with male, female or other gender identities are included within the term.

For example, an institution or a group of institutions can collect personal data relating to natural persons for a primary purpose and in addition to said primary purpose would also like to use the data for other purposes, referred to as secondary purposes. For example, the institution would like to pass on the information for example to other institutions. For example, a group of service providers (e.g. hospitals) collects personal data relating to patients in order to treat the patients. This data may include personal data, such as name, date of birth, address and the like, as well as health data, such as type of disease, blood values, X-ray images, etc. The service providers would then like to use the data for furthering clinical research, for clinical studies, for example. According to the General Data Protection Regulation (GDPR) and other regulations, this is possible only subject to very strict conditions. In this connection, anonymization techniques are extremely useful since anonymized data cannot be linked to an identifiable person (or "data subject") and is therefore no longer protected by the data protection provisions.

A basic principle of these data protection provisions is data minimization, which states that whenever personal data is required for a specific primary purpose, the volume of collected or processed data must be limited to the degree necessary in relation to the purposes for which it is processed. This applies in particular to personal health data, which is subject to very strict privacy and data protection regulations, such as e.g. the GDPR (General Data Protection Regulation) in the EU or the HIPAA (Health Insurance Portability and Accountability Act) in the USA.

One technique that contributes to compliance with the data minimization principle is anonymization, in which the persons responsible for the data processing require no access to the actual identity details or the actual values of the data attributes, yet the minimized data is nonetheless useful for the specified purposes, in particular for the above-mentioned secondary purposes.

In most cases, large amounts of personal data are acquired and stored in structured formats as datasets containing attribute-value pairs. Some examples in the context of medical data are structured formats such as DICOM and the HL7 (Health Level 7) standards, the FHIR (Fast Healthcare Interoperability Resources) standard, for example. They can be used for storing measurement values of vital functions, results of medical examinations and in particular information from imaging equipment (such as e.g. CT, MRT and ultrasound).

According to Recital 26 of the EU General Data Protection Regulation, the principles of data protection should not apply to anonymous information, i.e. to information which does not relate to an identified or identifiable natural person or to personal data that has been anonymized in such a manner that the data subject cannot or can no longer be identified. This regulation then also no longer applies to the processing of such anonymous data, e.g. for statistical or research purposes.

A database is anonymized if the identity of the data subjects is unknown, not identifiable, not accessible and not traceable (not detectable). Anonymization refers to a technique for removing information that could be used to identify the data subjects or be linked to them in some other way, or in order to obtain sensitive information about them. Anonymized data should refer neither to a specific or identifiable natural person nor to other anonymized personal data even if the data subject is not or no longer identifiable. It should therefore not be possible to link anonymous data either directly or indirectly to the persons from whom it originates. The idea is that the anonymized data resulting therefrom requires no further protection of privacy and, in particular following a release, no special mechanism for the management of information and associations. It must be (virtually) impossible to derive information, i.e. to deduce with significant probability the value of an attribute from the values of a series of other attributes.

A very well-known and widely established method is k-anonymization and related techniques that are associated with concepts such as t-closeness, l-diversity and differential privacy. k-anonymity is a simple and easy-to-use technique. The basis is that the datasets of the different subjects (e.g. persons) are modified via one of the techniques "suppression" and "generalization" in such a way that each dataset corresponding to a subject (i.e. a person) can no longer be distinguished from a relatively large number of other subjects. More precisely, the anonymity set is the set of subjects having the same attributes such that they cannot be distinguished from one another within the specified context. "Relative anonymization" signifies this indistinguishability from the perspective of a particular group of observers to whom the anonymized database is disclosed.

The subjects in the anonymity groups, if these groups are large enough—in the case of a k-anonymization they contain at least a number k of subjects—are therefore considered as anonymous or, more specifically, as k-anonymous.

However, if the entire database is not known from the outset, the existing methods cannot be applied. In order to use the existing methods, in other words, it is necessary to wait until all the data of all the study subjects has been input into the database in order to analyze how large the anonymization sets will be for certain degrees of suppression or generalization. In some cases the data therefore cannot be used for a relatively long period of time, e.g. until all the data has been collected and recorded.

SUMMARY

It is therefore an object of embodiments of the present invention to provide an automated method for anonymizing databases which can also be used even when all the entries in the database are not yet known, but the data of different subjects is only input over the course of time.

At least this object is achieved according to one or more embodiments of the present invention by a computer-implemented method for anonymizing data and a device for anonymizing data as defined at least in the independent claims. The dependent claims define embodiment variants of the present invention.

Irrespective of the grammatical gender of a particular term, individuals having male, female or other gender identity are also included.

According to an embodiment of the present invention, a computer-implemented method for anonymizing data via generalization is provided. The data comprises a first number of first datasets at a first time point and a second number of second datasets at a second time point. With respect to time, the second time point occurs after the first time point, for example, i.e. the second time point is a later time point than the first time point. The first datasets are a subset of the second datasets; in particular the first datasets are a proper subset of the second datasets. In other words, less data is present at the first time point than at the second time point. Only the first datasets are present at the first time point, whereas the first datasets and further datasets are present at the second time point, the first datasets and the further datasets combined forming the second datasets. A gap between the first time point and the second time point can amount to several days or weeks and it may be that a further processing of the data for secondary purposes is scheduled to be performed already at or shortly after the first time point, for which reason an anonymization is necessary already at the first time point. The method comprises a generation of a first generalization for the first datasets which fulfills a required anonymization. The required anonymization may be for example a k-anonymity, t-closeness or l-diversity. The first generalization comprises a first group of assignment ranges by which values of a quasi-identifier of the data are generalized. The assignment ranges may be for example value intervals by which the values of the quasi-identifier are abstracted. The assignment ranges may also be multidimensional ranges which are assigned to value ranges of a plurality of quasi-identifiers, each dimension of the assignment range being assigned one quasi-identifier of the plurality of quasi-identifiers. The first datasets can be anonymized already on the basis of this first generalization and consequently be processed further anonymously. The method further comprises a generation of a second generalization for the second datasets which fulfills the required anonymization. For example, the second generalization can be generated when the second datasets are available at the second time point. The second generalization comprises a second group of assignment ranges by which values of the quasi-identifier are generalized. The second group of assignment ranges comprises more assignment ranges than the first group of assignment ranges. Each generalization therefore possesses the desired anonymization such that already at the first time point the first datasets collected up to that point can be processed further in an adequately anonymized form. As soon as further datasets have been collected, these can be anonymized via the second generalization and thus made available successively for further processing.

It is clear that the method is not limited to a first and second generalization at a first time point and second time point, but that the method can be used for further generalizations, e.g. a third generalization and a fourth generalization, etc. in order at any given time to anonymize the totality of datasets present at the respective time points and to provide them for the further processing. Since the second or further group of assignment ranges of the second or further generalization has increasingly more assignment ranges than the first or preceding group of assignment ranges of the first or preceding generalization, the benefit gained from the anonymized data, for example in the case of an evaluation for a scientific research project, can increase ever further as the volume of data increases.

For example, the data at a further, in turn later, time point can comprise a further number of further datasets. The further datasets are a superset of preceding datasets at a preceding time point, preferably a proper superset. According to the method, a further generalization for the further datasets is generated on the basis of a preceding generalization. For generalization of the quasi-identifier, the further generalization comprises a further group of assignment ranges for the quasi-identifier. The further group comprises more assignment ranges than a preceding group of assignment ranges of the preceding generalization. The preceding generalization is for example the second generalization or a further generalization iteratively based on the second generalization.

The assignment ranges can be chosen for example in such a way that it holds true for each value of the quasi-identifier that the value is assigned at most to one of the assignment ranges of the first group, and that it holds true for each value of the quasi-identifier that the value is assigned at most to one of the assignment ranges of the second group. Since the assignment ranges are chosen in such a way that each value of the quasi-identifier is assigned to only one of the assignment ranges of the respective group, a desired k-anonymity for example can be achieved in a simple manner.

Furthermore, a value set which is assigned to the totality of assignment ranges of the first group can be identical to a value set which is assigned to the totality of assignment ranges of the second group. Even if it is not necessary at the first time point due to the lower number of first datasets and the possibly limited value set as a result to frame the first group of assignment ranges so comprehensively that it goes far beyond the value set of the first datasets, this can make sense in order, on the one hand, to make as few changes as possible in a subsequent processing of the anonymized data and, on the other hand, to allow no inferences to be made about sensitive data which would be possible as a result of the expansion of the totality of assignment ranges.

In further examples, it applies to each assignment range of the second group that a value set of the respective assignment range is a subset of a value set of precisely one assignment range of the first group. It should be noted that these are not required to be proper subsets, i.e. it can apply to certain assignment ranges of the second group that these are identical to a corresponding assignment range of the first group. However, some assignment ranges of the second group are proper subsets of precisely one assignment range of the first group. In other words, an assignment range of the second group never extends across two assignment ranges of the first group. Accordingly, an assignment range of the second group corresponds either precisely to a corresponding assignment range of the first group, or an assignment range of the first group is subdivided into two or more assignment ranges of the second group. By this mechanism and/or means it can be ensured that even by a common consideration of the assignment of the data into the assignment ranges of the first group initially and subsequently into the assignment ranges of the second group, the desired anonymity is ensured.

For example, a respective interval of values (e.g. age or ZIP codes) is assigned to a respective assignment range of the first group. The intervals of the first group have interval lengths that are independent of one another. A respective interval length of a respective interval of the first group is dependent on a number of datasets of the first datasets that are assigned to said interval. A desired generalization, for example k-anonymity, can thereby be achieved in a simple manner, at least in relation to an attribute of the first datasets assigned in the respective assignment range.

In further exemplary methods, a statistical distribution of values of the quasi-identifier is determined. This is determined for example on the basis of further data comprising datasets that include the quasi-identifier. The further data may have been acquired independently of the above-mentioned data, for example in a different clinical study or in a different context. However, said further data comprises the quasi-identifier as an attribute, thus enabling a statistical distribution of values of said quasi-identifier to be determined. On the assumption that said statistical distribution also applies to the above-mentioned data that is to be processed via the present method, at least in the long term, a target generalization is generated on the basis of the statistical distribution. The target generalization comprises a target group of assignment ranges by which values of a quasi-identifier of the data are generalized. The first generalization and/or the second generalization are/is generated in addition as a function of the target generalization.

In further examples, each assignment range of the first group comprises an at least two-dimensional assignment range by which values of the quasi-identifier and values of at least one further quasi-identifier of the data are generalized. The generalization is therefore applied to at least two quasi-identifiers. The generalization can also be applied to more than two quasi-identifiers. A dimension of the assignment range increases accordingly. With three quasi-identifiers, three-dimensional assignment ranges are produced, with four quasi-identifiers, accordingly four-dimensional assignment ranges, etc.

Each assignment range of the second group comprises a two- or higher-dimensional assignment range by which values of the quasi-identifier and values of at least one further quasi-identifier of the data are generalized. In principle, the same applies to the two- or higher-dimensional assignment ranges as to the above-mentioned intervals corresponding to a one-dimensional case. In the two-dimensional case, for example, the assignment ranges of the second group can be embodied in such a way that they are in each case fully contained within an assignment range of the first group. In other words, assignment ranges of the second group never overlap two assignment ranges of the first group. The assignment ranges of the second group are therefore either smaller than or exactly the same size as corresponding assignment ranges of the first group. To put it the other way round, an assignment range of the first group is either assigned to precisely one assignment range of the second group or it is subdivided into two or more assignment ranges of the second group, as a result of which the number of assignment ranges of the second group is greater than the number of assignment ranges of the first group.

As described further above, information relating to the quasi-identifiers of other studies can be used even when two- or higher-dimensional assignment ranges are used. For example, statistical distributions of values of the quasi-identifier and of values of the at least one further quasi-identifier can be determined, for example on the basis of further data from other studies comprising datasets which include the quasi-identifier and the at least one further quasi-identifier. A target generalization can be generated on the basis of the statistical distributions. The target generalization comprises a group of two- or higher-dimensional assignment ranges by which values of the quasi-identifier and of the at least one further quasi-identifier are generalized. The first generalization and/or the second generalization can additionally be generated as a function of the target generalization. In particular when there are still very few datasets available at the time the group of first assignment ranges is generated, it can be avoided by this means that boundaries between assignment ranges are set up which later, for example for the second or third group of assignment ranges, are at least to some extent unsuitable. This can occur in particular in the case of two- or higher-dimensional assignment ranges within the course of the further refinement. The use of this "prior knowledge" about value distributions of the quasi-identifiers from other studies can advantageously be used to avoid such subsequent inadequacies.

A further aspect of embodiments of the present invention relates to a device for anonymizing data via generalization. The data can be collected and recorded over a relatively long time period of, for example, days, weeks or months. The data therefore comprises a first number of first datasets at a first time point and a second number of second datasets at a second later time point. The first datasets are a subset, preferably a proper subset, of the second datasets. The device comprises a processing device which is embodied to generate a first generalization for the first datasets which fulfills a required anonymization. The first generalization comprises a first group of assignment ranges by which values of a quasi-identifier of the data are generalized. The processing device is further embodied to generate a second generalization for the second datasets. The second generalization comprises a second group of assignment ranges by which values of the quasi-identifier are generalized. Just like the first generalization, the second generalization fulfills the required anonymization. The second group of assignment ranges comprises more assignment ranges than the first group of assignment ranges.

The processing device comprises for example a microprocessor controller having a memory and input/output devices, for example a computer system or a server. The data that is to be anonymized can be stored in the memory of the processing device. Parameters for the generalization, such as e.g. the desired degree of anonymization, for example the desired value for k in a k-anonymity, as well as a categorization of the attributes of the data in identifiers, quasi-identifiers and sensitive attributes can be set for example via the input/output devices by for example an operator or via a corresponding configuration file.

The device is therefore embodied for performing the above-described method and therefore likewise comprises the above-described advantages.

Embodiments of the present invention further relate to a computer program product comprising a computer-readable program code which is embodied to cause a processing device to perform the steps of the above-described method.

Embodiments of the present invention also relate to a computer-readable storage medium which is embodied to store therein a computer program product comprising a computer-readable program code which is embodied to cause a processing device to perform the steps of the above-described method.

It is clear that the above-mentioned features and the features explained below can be used not only in the combinations disclosed in each case, but also in other combinations or separately from one another without departing from the scope of the present invention.

BRIEF DESCRIPTION OF THE DRAWINGS

The present invention is described in detail below with reference to the figures, which depict embodiment variants of the present invention.

FIG. 4 schematically shows three different generalizations for the number of datasets from FIG. 3.

FIG. 5 schematically shows generalizations with different interval widths.

DETAILED DESCRIPTION OF THE EMBODIMENTS

Figure 1:
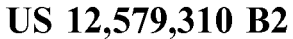
FIG. 1 schematically shows a relationship between refinements of generalizations.
Figure 1:
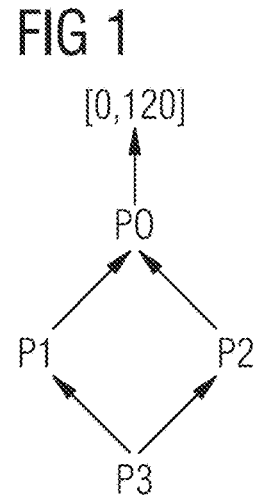

Some examples of the present disclosure relate generally to one or more circuits, control devices or other electrical devices. All references to the circuits, control devices and other electrical devices and to the functionality provided by them are not intended to be limited to comprise only that which is presented and described here. Even if the different circuits, control devices and other electrical devices can be ascribed specific designations, these are not to be limited by the range of functions of the circuits, control devices and other electrical devices. Such circuits, control devices and other electrical devices can be combined with one another and/or separated in any arbitrary manner depending on which type of electrical implementation is desired. Needless to say, any circuit or other electrical device disclosed here can comprise any desired number of microcontrollers, graphics processing units (GPUs), integrated circuits, memory chips (e.g. FLASH, random access memory (RAM), read-only memory (ROM), electrically programmable read-only memory (EPROM), electrically erasable programmable read-only memory (EEPROM) or other suitable variants thereof) and software which cooperatively interact with one another in order to perform the operations, processes and/or method steps disclosed herein. Furthermore, one or more of the electrical devices can be embodied in such a way that they execute a program code contained in a non-transitory, computer-readable medium which is programmed in such a way that it executes an arbitrary number of the disclosed functions.

A method for anonymizing a given volume of data is initially described below in quite general terms. The data can be regarded for example as a large matrix, as shown in the following table:

| Identifiers | | Quasi-identifiers | | | | Sensitive attributes |
|---|---|---|---|---|---|---|
| Name | Address | ZIP | Date of birth | Gender | BMI | Diagnosis |
| Mr. Müller | Lone-str 1 | 33210 | 23 Dec. 1945 | male | 27 | Cancer |
| Mr. Abel | Home-str 5 | 335021 | 1 Jun. 1979 | female | 24 | Covid |
| . . . | . . . | . . . | . . . | . . . | . . . | . . . |

The rows of the matrix correspond to the data subjects, for example one row for each individual. The columns correspond to the attributes, for example name, address, ZIP code, date of birth or age, gender, BMI and diagnosis. Each row of the table represents a dataset which relates to a particular subject, and the values in the various columns are the values of the attributes associated with these subjects. Each attribute is categorized in turn into one of the three following classes:

Identifiers: These are attributes which—taken individually normally identify individuals, such as name, address, telephone number, ID number.

Quasi-identifiers: These are attributes which in their combination and the linkage of this combination with external information can be used to identify individuals. In other words, even if such a field on its own does not identify the individual, the combination of several of these attributes is problematic. For example, given date of birth, ZIP code and weight or BMI of a subject, the probability of identifying the individual can be very high.

Sensitive attributes: These are attributes which contain personal information that should not be linked publicly with an individual/a user/an ID, such as e.g. diagnosis, salary, etc.

In order to achieve k-anonymity, the values of the attributes of the identifiers are eliminated (for example deleted or replaced by random values) and the values of the attributes of the quasi-identifiers (and to some extent also the values of the sensitive attributes) are generalized (i.e. assigned a broader value) in that the data value is replaced by a less precise value which is semantically consistent or is suppressed by eliminating the information. The replacement of a data value by a less precise value is also referred to as "abstracting" the data value. For example, the age of a person in years, e.g. "52", can be abstracted by a less precise age range, e.g. "50 to 60".

On the assumption that the possible data values for the age of patients in a medical study may range from 0 to 120 years, only an age between 40 and 100 years, for example, is relevant for the purposes of a study.

A suppression of this information is equivalent to the assertion that the age lies in the range $[0, 120[$, i.e. no information about the age is reproduced. A generalization can be realized for example via age intervals.

In relation to the specification of intervals, the following definition is used in this description: [a, b[ is a half-open interval which contains the first value a and does not contain the last value b. Although mainly half-open intervals of the form [a, b[ are used in this description, the methods described herein are not limited thereto. It is equally possible to use half-open intervals]a, b] which do not contain the first value a and do contain the last value b. Also, open and closed intervals can be used alternately, for example. It should be noted that it is important when choosing the intervals to avoid a value being contained in two or more intervals or relevant values not being contained in any interval.

A possible generalization consists for example in using only the interval [40, 100 [ and suppressing (deleting) all the datasets that do not fall within this interval.

It is described hereinbelow, with reference to an example including intervals that relate to age, how generalizations can be "refined" and which conditions apply to ensure that one generalization is "finer than" another generalization. The terms "refine" and "finer than" are used in the further course of this description in accordance with the following definition.

In the example described hereinbelow with reference to FIG. 1, different generalizations P0 to P3 are used which have different subdivisions of the age interval [40, 100 [.

The generalization P0 denotes a set containing only one interval: P0={[40, 100 [}.

The generalization P1 contains a set of six intervals:

$$P1 = \{[40, 50[, [50, 60[, [60, 70[, [70, 80[, [80, 90[, [90, 100[\}.$$

The generalization P2 contains a set of four intervals:

$$P2 = \{[40, 55[, [55, 70[, [70, 85[, [85, 100[\}.$$

It is important to note that the intervals of a generalization do not overlap, i.e. that there is no value which can be assigned to two intervals of a generalization. Accordingly, each value of a quasi-identifier can be assigned to precisely one interval of a generalization.

Each of the generalizations P0, P1 and P2 represents a generalization with respect to the actual age values. Actual age values are for example precise age details in years, i.e. for example an age of 36 years or an age of 52 years. In a generalization of the actual age values, the age value of any one dataset is assigned to one of the value intervals of the generalization. For example, when the generalization P0 is used, the age value 52 is assigned to the single interval [40, 100 [. If the generalization P1 is used, the age value 52 is assigned to the interval [50, 60[, and if the generalization P2 is used, the age value 52 is assigned to the interval [40, 55[.

Within the meaning of the present description, a generalization X is then and only then finer than another generalization Y if each interval in X is contained in precisely one interval in Y. The generalization P1 is therefore finer than the generalization P0. Similarly, the generalization P2 is finer than the generalization P0. However, although the generalization P1 has smaller intervals than the generalization P2, the generalization P1 is not finer than the generalization P2 since, for example, the interval [50, 60[ of the generalization P1 is not fully contained in precisely one interval of the generalization P2. Also, the generalization P2 is not finer than the generalization P1.

The generalization P3 contains a set of twelve intervals:

$$P3 = \{[40, 45[, [45, 50[, [50, 55[, \ldots \; [85, 90[, [90, 95[, [95, 100[\}$$

The generalization P3 is finer than the generalization P2 and also finer than the generalization P1. Each of the intervals in P3 is contained in an interval of P1 and each of the intervals of P3 is also contained in an interval of P2. This relationship is illustrated graphically in FIG. 1. An arrow signifies that the starting point of the arrow is assigned to a generalization which is finer than a generalization that is assigned to the endpoint of the arrow.

An arrow between the interval sets P3 and P1 in FIG. 1 further signifies for example that an anonymization having the intervals of P3 delivers more accurate information for a secondary purpose than an anonymization with P1.

Each combination of quasi-identifiers that appears in the above table determines an anonymization set. The subjects (e.g. individuals) having identical quasi-identifiers following the anonymization, i.e. the same values of the generalized quasi-identifiers, are indistinguishable. The anonymization sets are also referred to as equivalence classes.

With k-anonymization, for example, the generalization and/or suppression are/is selected in order to ensure that all the anonymization sets contain at least k subjects.

If an attribute is suppressed, then it can be deleted for example in the data passed on for further processing, for example a study or other secondary purposes, or the values of this attribute can be set in all the datasets to a predefined value which indicates that this attribute contains no usable information. If an attribute is generalized, then the actual value of the attribute is replaced by an abstracted value, for example by a value which indicates in which interval the actual real value of the dataset is located. If, for example, the above-defined twelve intervals of the generalization P3 are designated by the letters A, B, C, . . . L, an actual age of 52 years in a dataset can be replaced for example by the letter C, which denotes the interval [50, 55 [. Intervals represent a possible mechanisms and/or means of generalization. An abstraction of the values takes place as a result of the generalization. An association exists between the values of the interval and a designation for the interval which represents the abstraction value for the values in the interval. If multiple variables are generalized simultaneously, for example n variables, a corresponding abstraction can be performed for a corresponding n-dimensional range. For two variables, these ranges can be regarded as areas, preferably rectangles. Such an n-dimensional range is referred to quite generally in this description as an assignment range, which corresponds in the one-dimensional case to an interval, for example, and in the two-dimensional case to an area.

In addition to k-anonymization, there are further similar methods, such as t-closeness and l-diversity. The techniques proposed herein can also be applied directly to these. However, the three cited methods (k-anonymization, t-closeness and l-diversity) are typically applied only when the database that is to be anonymized is completely known prior to the anonymization. In order to employ the methods when the data is collected over a long period of time, there is therefore a period of waiting until all the data has been collected before the suppression and generalization are continued.

Below there follows a description of anonymization techniques, in particular for k-anonymization, which enable databases to be anonymized automatically, in particular a k-anonymization to be achieved, even when not all the entries in the database are known a priori, but the entries for different subjects are input only in the course of time. In other words, these techniques enable the data to be anonymized even if not all the data is present at the outset.

In a first exemplary method, a database is anonymized at different time points. Respective "snapshots" of the database are taken at the different time points and a corresponding anonymization is performed. The database grows in size, i.e. datasets are added, between the respective snapshots. A respective anonymization of a snapshot is performed in each case on the totality of non-anonymized datasets available at this time point.

For example, the database contains a first number of first datasets at a first time point and a second number of second datasets at a later second time point. The set of first datasets is a proper subset of the set of second datasets. A first generalization is performed for the first datasets, thereby fulfilling a required k-anonymity, for example. For this purpose, as described above, values of quasi-identifiers of the database are generalized, for example by replacing actual values by specification of a value range from a group of value ranges. In other words, a group of assignment ranges, for example value intervals for age, for example, is defined for this first generalization and only the assignment range assigned to the actual value is noted in each dataset instead of the actual value. The thus generalized database is able to fulfill a required anonymization and can therefore be used for other secondary purposes, for example clinical studies, without violating data protection requirements. The original database, i.e. the database prior to the generalization, can be extended by further datasets over the course of time. For example, a number of datasets can be added over the course of several days, weeks or months. A second generalization, which likewise fulfills the required anonymization, for example the above-mentioned k-anonymization, can be performed at the later second time point for the set of datasets then available. To that end, values of quasi-identifiers of the database are once again generalized at this time point. Because more datasets are now available, the second generalization can comprise more assignment ranges than the first generalization. As a result, the anonymized data of the database at the second time point can have a greater validity and nonetheless still fulfill the data protection requirements. Further snapshots of the dataset can be taken at even later time points and further generalizations performed with even more assignment ranges, as a result of which the usability of the anonymized data can be improved further in for example surveys or studies based thereon.

Figure 2:
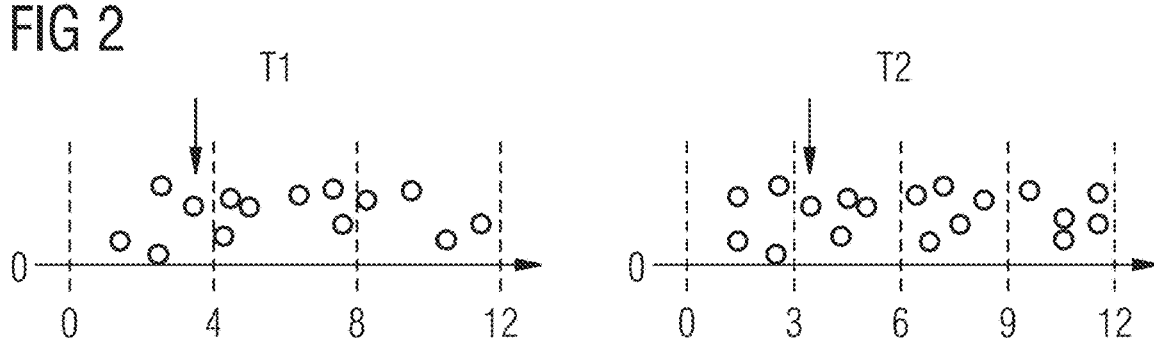
FIG. 2 schematically shows two generalizations at two different time points.

FIG. 2 shows by way of example two different snapshots of a database with generalizations of a quasi-identifier having actual real values between 0 and 12.

At a first time point T1, fourteen datasets are present, for example, each of which is represented by a circle in FIG. 2. A first generalization at time point T1 contains three assignment ranges, which in the present example are three intervals of width 4, i.e. the values of the quasi-identifier are generalized or abstracted across the three intervals [0, 4[, [4, 8[, [8, 12 [. At a later time point T2, eighteen datasets are present. A second generalization at the time point T2 contains four assignment ranges, which in the present example are four intervals of width 3, i.e. the four intervals [0, 3[, [3, 6[, [6, 9[, [9, 12[. Each of these intervals, taken per se, is k-anonymous, e.g. 4-anonymous. It is important to note with this method, however, that sensitive information can be revealed unexpectedly as a result of changing the generalization, as the example shown in FIG. 2 illustrates.

This is because an observer having access to both snapshots T1 and T2 can realize that one of the datasets (marked with an arrow) is in the interval [0, 4[ at time point T1, for example, and is in the second interval [3, 6[ at time point T2. The observer can then for example analyze the values of the sensitive attributes of the datasets and recognize that the two datasets correspond to the same original dataset because the sensitive attributes for the two datasets are identical in the anonymized databases. The dataset having these identical sensitive attributes is in [0, 4[ at T1 and later, at T2, in [3, 6[. If the dataset relates for example to an individual, the observer can therefore conclude for this data subject that the generalized attribute (i.e. the value of the quasi-identifier of this dataset) is less than 4, but greater than or equal to 3. The value is consequently not protected by the 4-anonymity if the observer has access to both snapshots of the database.

This can be avoided for example by a subsequently applied generalization being finer than a previously applied generalization. If, for example, a subdivision is chosen at a specific time point, e.g. the interval [0, 4[ at time point T1 in the above example, then only finer subdivisions of [0, 4 [ should be chosen later, but no subdivisions which extend beyond an interval limit. In other words, the generalization should be refined each time.

A further exemplary method therefore provides to anonymize snapshots of the database taken at different times, each new choice of the generalization of quasi-identifiers in this case being finer than the previous one, however.

This also applies to databases in which a number of quasi-identifiers are generalized, such as in the above table, for example, the age or date of birth and the ZIP code. In these cases the generalization is a multidimensional problem, the dimension corresponding to the number of quasi-identifiers.

In particular in the case of multidimensional problems having many quasi-identifiers, it can happen that a decision is taken at a first time point in favor of a subdivision of the assignment ranges, which can likewise be multidimensional, although at this time point it is not yet clear which decision is suitable or optimal in the long term, in particular taking into account that subsequent generalizations should represent refinements of the preceding generalizations.

For example, it can be useful at a first time point, given the datasets present in the database, to generalize a particular attribute in a certain way, though in the long term this may lead to a solution that is not optimal. This is illustrated below with reference to an example shown in FIG. 3 and FIG. 4.

Figure 3:
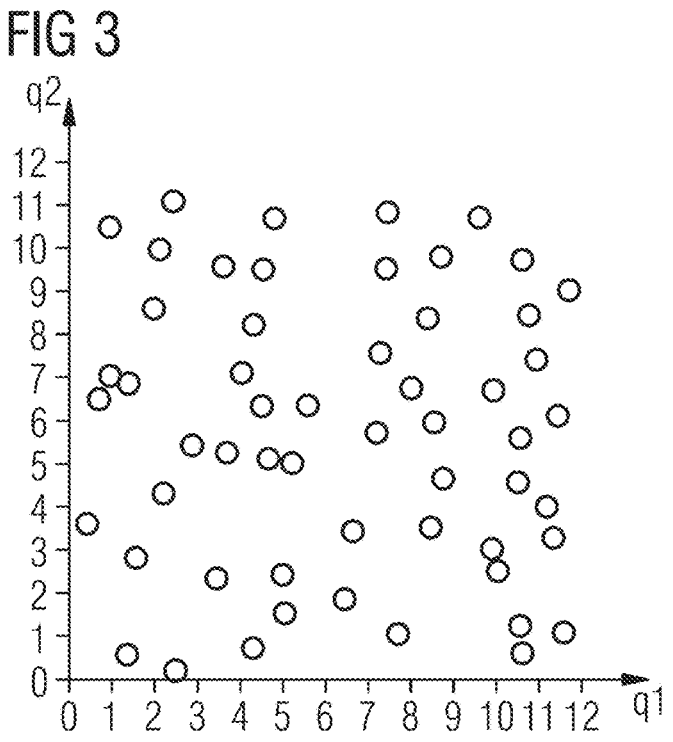
FIG. 3 schematically shows values of two quasi-identifiers from a number of datasets.

Two quasi-identifiers q1 and q2 are given, each of which has real values between 0 and 12. In FIG. 3, each circle indicates the values of q1 and q2 for a corresponding dataset. In order to achieve a desired anonymization, for example a 4-anonymity, it is possible to generalize the values across intervals of width 3 (e.g. [0, 3[, [3, 6[, [6, 9[, [9, 12 [) or of width 4 (e.g. [0, 4[, [4, 8[, [8, 12 [). FIG. 4 shows corresponding generalizations.

In the example of FIG. 3, however, it is not possible to generalize both quasi-identifiers across intervals of length 3 at the time point at which the datasets shown in FIG. 3 are present. At least one of the two quasi-identifiers must be generalized across intervals of length 4 in order to obtain 4-anonymity. The three possibilities, including the option to generalize both across intervals of length 4, are shown in FIG. 4.

However, the three options shown in FIG. 4, i.e. to group the datasets by subdividing the values of the quasi-identifiers into intervals of length 3 or 4, results in none of these generalizations being finer than another.

If one of the three options is selected at a first time point, it can be difficult at a later second time point to subdivide these intervals in an optimal manner by refinement. Depending on which values apply to the further data subjects that are available in addition at the second time point, one or the other of the generalizations of FIG. 4 may be optimal in retrospect. However, since there is no information about the likely number of datasets still to be acquired and their contents, the decision in favor of one of the three options at the first time point is difficult.

In many cases, however, additional general information about for example distributions of values of the quasi-identifiers is available, which can be taken into account in the generalization at an early time point, in particular at the time of a first generalization. In clinical studies, it can be known for example that young patients tend to suffer less often from certain clinical conditions than older patients, or the other way round in the case of other clinical conditions. In an optimal classification, therefore, the intervals in the ranges in which a medical condition occurs less frequently are chosen greater than in the ranges in which the medical condition occurs more often. Intervals of a first generalization may for example have different lengths as a result. FIG. 5 shows a corresponding generalization for two quasi-identifiers q1 and q2.

In the center, where for example more datasets are present, the intervals and also the two-dimensional areas are smaller, and at the edges they are larger. Ideally, the number of datasets in each rectangle have the same number of elements, where the minimum of this number can be used as the value k for the k-anonymity.

In this exemplary method, the database is anonymized at different time points (snapshots) and each new generalization is finer than the previously used generalization. Furthermore, the assignment ranges, for example intervals or rectangles, are chosen different in size as a function of the density of the values of the quasi-identifiers. For example, intervals of a generalization can have different lengths.

The advantage is that more information can be made available for secondary purposes without violating the required k-anonymity and subsequent generalizations can be chosen in a more optimal manner at later time points.

In the above example of FIGS. 3-5, every combination of quasi-identifiers, e.g. age, number of hospital visits and BMI, is abstracted independently of the others. The age is subdivided into intervals (possibly with intervals of different length), the number of hospital visits is subdivided into intervals having a specific granularity and the BMI is likewise subdivided into a specific number of sets. However, it has not been taken into account in this case that these values can be correlated with one another and therefore some combinations may occur much more frequently than others. Thus, for example, the generated "long and narrow rectangles" formed in FIG. 5 may not be optimal, at least in certain regions, as at the top in FIG. 3 for example, where no datasets fall into the middle narrow rectangle at the top in the center. A subdivision that takes into account that certain combinations occur more frequently than others can be taken into account via rectangular assignment ranges as shown in FIG. 6.

Figure 6:
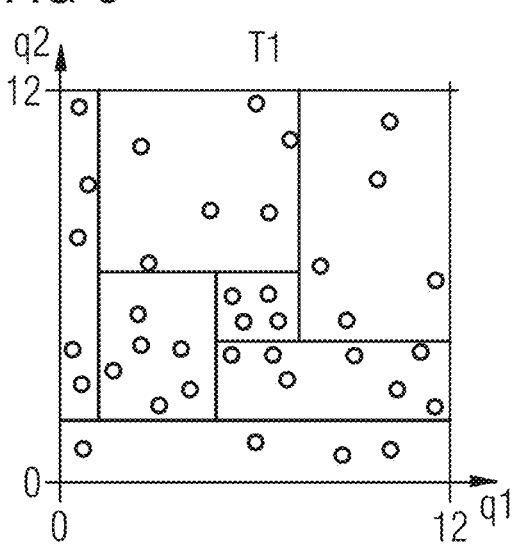
FIG. 6 schematically shows two generalizations at two different time points.
Figure 6:
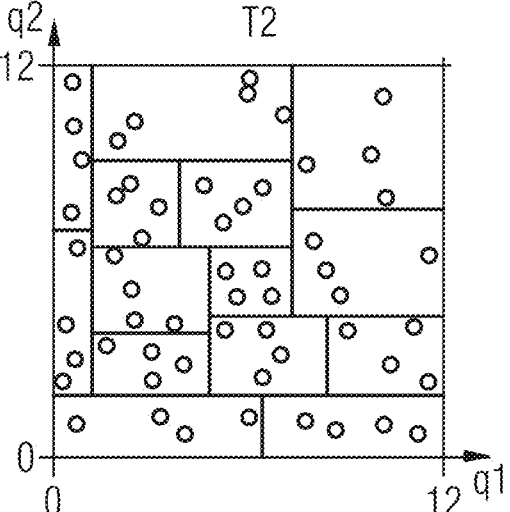

In said FIG. 6, assignment ranges of two generalizations for a database at two time points T1 and T2 are shown. Two quasi-identifiers q1 and q2 are anonymized. One required anonymization is a 4-anonymity, for example. A state at the first time point T1 is shown on the left. More datasets are available at time point T2, which is shown on the right. Accordingly, a finer generalization, i.e. a finer subdivision into rectangles, can be chosen at time point T2. As can be seen from FIG. 6, it also applies here that an assignment range of the generalization at time point T2 is assigned only to precisely one assignment range of the generalization at time point T1, i.e. each assignment range of the generalization at time point T2 is a subset of only one assignment range of the generalization at time point T1.

In this example, the rectangles can be fitted to distributions that are not products of distributions of the individual quasi-identifiers. Thus, it is possible for example that the distribution of the values is higher in the "bottom right-hand corner" and in the "top left-hand corner" than in the "top right-hand corner". The rectangle in the "top right-hand corner" can therefore be wider in both directions, as shown in FIG. 6. This is necessary if the quasi-identifiers are not independent of one another.

In this example, the anonymization of the database is therefore accomplished via different "snapshots" over time. In this case each new choice of abstraction is finer than the preceding abstraction. The quasi-identifiers are not abstracted into intervals or assignment ranges independently of one another, but combinations of them are abstracted into multidimensional assignment ranges, in the two-dimensional case, for example, in the form of the rectangles shown in FIG. 6.

This enables more information to be made available for secondary purposes, for example for clinical studies, without compromising the k-anonymity.

In particular in situations in which many dimensions are present, an optimization in the long term, i.e. over multiple time points with increasing database size, is fairly difficult to achieve, and it is difficult or even impossible to predict which choice of individual generalization steps will lead to optimal results in the future. On the other hand, the ever-finer generalization requires a first assignment to be chosen already at the first time point during the first generalization, which affects all subsequent assignments. Limits of the first assignment should not be violated in later assignments in order to avoid the problems described with reference to FIG. 2.

In a further example for anonymization of data of a database, statistical data from one or more additional sources is therefore analyzed. In the case of medical data, these sources could include data from hospitals, a public clinical register, the Robert Koch Institute, the German Federal Statistical Office, a preprocessing of the available output data, etc. Similar sources exist for traffic or mobility data. In the case of medical data, the incidence of the disease or the clinical diagnosis across patients of different ages and as a function of body weight, gender etc. is an important starting point. For mobility data, data relating to the use of certain transport routes—freeways or trains—is available in a similar manner. An abstraction target is specified using this statistical data and an expected number of datasets that will likely arrive during the entire data acquisition period (or over a long period of time if the data acquisition has no definite end). This abstraction target is a subdivision of the quasi-identifiers into assignment ranges using the k-anonymity method. If multiple quasi-identifiers are subjected to the anonymization, the assignment ranges will have a corresponding dimension. In the case of two quasi-identifiers, the assignment ranges are rectangles, for example, as shown in FIG. 6. In addition to the (multidimensional) assignment ranges (for example rectangles), this statistical analysis can also indicate the relative sizes of the assignment ranges, which are given by the proportion of expected cases in the respective assignment range.

Since these sources generally provide no actual datasets, but only an expected number of datasets, this step can be performed with synthetic data (simulated data) using the known distributions. An abstraction target is a set of relatively small assignment ranges (for example rectangles in the two-dimensional case) which will likely be achieved and in some cases are also actually achieved. In some cases, however, these can only be approximately achieved because certain deviations are necessary, as is explained later. The assignment ranges can be products of intervals of the quasi-identifiers having the same or different width as in FIG. 5, or assignment ranges as in FIG. 6. However, the assignment ranges should not be too small since the synthetic data is only a first approximation to the expected data and there will likely be deviations when the real data is used.

The abstraction target is therefore an abstraction which is to be achieved approximately with increasing size of the database and which can be achieved if the future data has the expected distribution and the deviation of the data obtained in the future from the expected data is not too great.

The abstraction target is used in order to decide which quasi-identifier (or which combination of quasi-identifiers) is to be refined. In particular in the case of multidimensional generalizations with multiple quasi-identifiers, it is possible during a generalization to perform a refinement either for the one quasi-identifier or for the other quasi-identifier.

Without an abstraction target, however, it is unclear at the time point at which the decision is taken which decision will be optimal in the long term. Since subsequent generalizations always represent refinements of the preceding generalizations, an optimal distribution of assignment ranges of a subsequent generalization can be difficult, depending on how the values for the next data subjects are, if limits of the assignment ranges lie unfavorably in a preceding generalization. Generalizations can be suitably embodied on the basis of the statistical data relating to the likely number and distribution of future datasets and the abstraction target formed therefrom, even if the database initially contains few datasets. For example, it can easily be recognized on the basis of the abstraction target whether an interval or rectangle or multidimensional assignment range should better be subdivided in one way or another. The abstraction target should be finer than the generalization in the next step.

In one example an abstraction target is therefore generated, as just explained, and this is then used in order to make the right selection from available options for generalizations.

Figure 7:
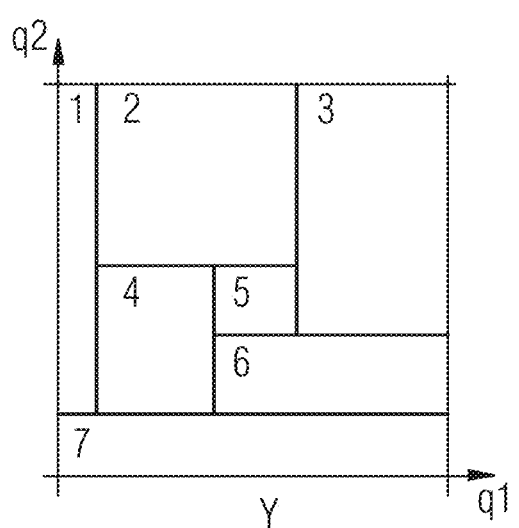
FIG. 7 schematically shows two generalizations at two different time points.
Figure 7:
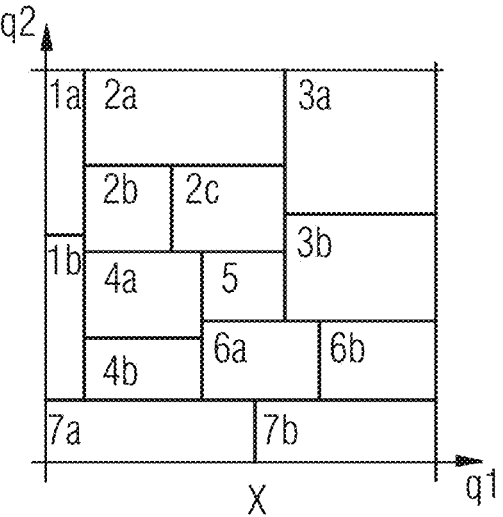

The abstraction target controls the selection as follows. The best choice is that in which the abstraction target is finer than the chosen generalization (or any generalization that meets this condition if there are several). There is a simple criterion to establish whether a generalization X is finer than a generalization Y, as shown in FIG. 7. A generalization X is finer than a generalization Y when and only when each assignment range (e.g. each rectangle in the two-dimensional case for two quasi-identifiers q1 and q2) of generalization X is contained in an assignment range of generalization Y. As shown in FIG. 7, $1a \subseteq 1$, $1b \subseteq 1$, $2a \subseteq 2$, $2b \subseteq 2$, $2c \subseteq 2$, $3a \subseteq 3$, $3b \subseteq 3$, $4a \subseteq 4$, $4b \subseteq 4$, $5 \subseteq 5$, $6a \subseteq 6$, $6b \subseteq 6$, $7a \subseteq 7$, $7b \subseteq 7$ (the range of generalization X is indicated to the left of the subset symbol in each case and the range of generalization Y to the right in each case). Generalization X is therefore finer than generalization Y. If generalization X is finer than generalization Y, then it also applies conversely that generalization Y is coarser than generalization X.

Figure 8:
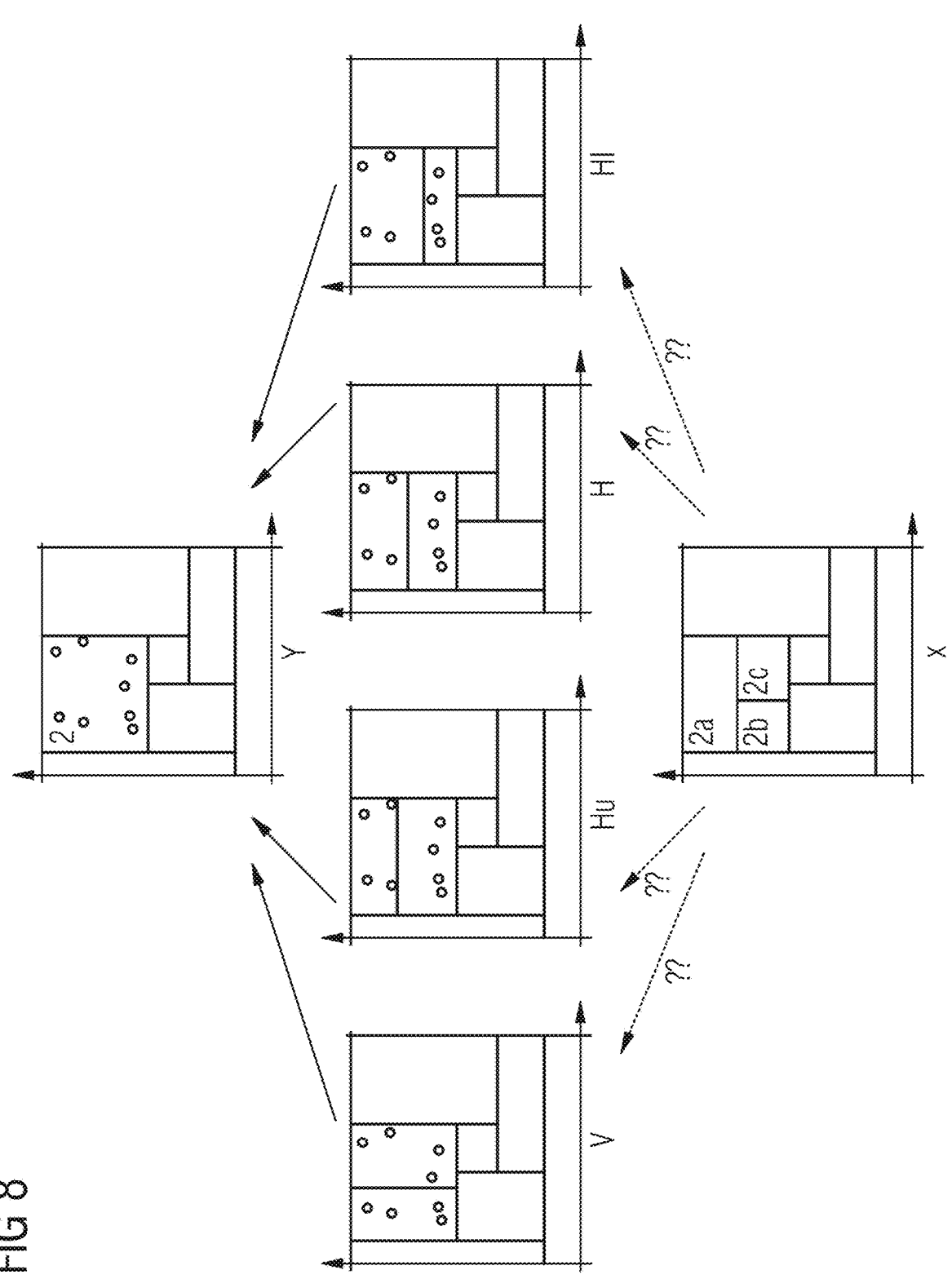
FIG. 8 schematically shows possible generalizations which are based on an existing generalization, as well as a target generalization.

FIG. 8 shows an example comprising two quasi-identifiers. Starting from a generalization Y, the range 2 shown therein is to be subdivided in a further generalization step in order to enable more accurate but still anonymized data to be provided for a secondary purpose. A 4-anonymity is required, for example. The range 2 contains eight datasets, each of which is represented by a circle in generalization Y. In order to maintain a 4-anonymity, the range can be further subdivided in different ways, for example by a vertical division, as shown in generalization V, or by a horizontal division at different levels, as shown in generalizations Hu, H and Hl in FIG. 8. Because, as previously explained, subsequent generalizations should always be chosen finer than a current generalization, each of the generalizations V, Hu, H and Hl represent restrictions for a subsequent generalization. At the time point at which one of the generalizations V, Hu, H and H is to be selected, it is often not yet clear which one is more or less favorable for subsequent generalizations. By taking into account a likely distribution of datasets from statistical data from other sources, it is possible to select a probably favorable generalization. In the example of FIG. 8, a typical statistical distribution of datasets of the relevant quasi-identifiers is known from other sources, in the case of medical studies, for example, from sources of the Robert Koch Institute, from which a target generalization X can be derived which subdivides the range 2 into the assignment ranges 2a, 2b and 2c shown in FIG. 8 in order to achieve a 4-anonymity. It is apparent from FIG. 8 that a refinement in the direction of the target generalization X is possible only via generalization H. Generalization H should therefore be chosen in the next step.

If none of the available possible generalizations possesses the property that the corresponding target generalization is finer than possible generalizations, it is possible either to wait until more data has been added to the database or to choose the generalization which comes closest to the abstraction target, depending on how much deviation from the abstraction target can be tolerated. This deviation from the abstraction target can be a permanently predefined value or a parameter of the method which can be set for example as a function of how many datasets are to be expected.

Figures 9, 10, 11:
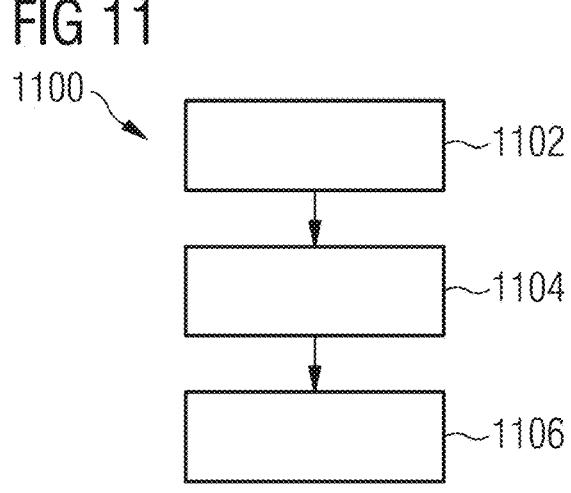
FIG. 9 schematically shows possible generalizations which are based on an existing generalization, as well as a target generalization.
FIG. 10 schematically shows a device for anonymizing data via generalization.
FIG. 11 schematically shows method steps of a method for anonymizing data via generalization.

If, for example, as shown in FIG. 9, in the case of a current abstraction Y, an abstraction target G and multiple abstractions C1, C2 which refine Y, none of the multiple abstractions C1, C2 is coarser than G, the method consists in choosing the abstraction in such a way that the deviation from the target G is minimal. Only two possible abstractions C1, C2 are shown in the example in FIG. 9. However, the method can be easily extended to cover an arbitrary number of possible abstractions C1, C2, . . . Cn.

If the abstraction target G is not finer than an abstraction C of the possible abstractions, the deviation of the abstraction C from the abstraction target G can be determined as follows. Initially, the deviation from G of each assignment range (e.g. each rectangle) from C is defined as follows.

For each assignment range RG that is defined in G, those assignment ranges RC defined in C are considered which intersect the assignment range RG. If only one assignment range RC intersects the assignment range RG, then RG is contained in RC and the deviation from RG is defined as zero. If multiple assignment ranges RC intersect the assignment range RG, the sizes of these intersections are considered and the assignment range RC which has the greatest intersection with RG is selected. The deviation of the assignment range RG is the sum of the sizes of these intersections with the exception of the greatest intersection. In other words, the deviation of the assignment range RG is the smallest sum of all the intersections except one, namely the greatest intersection.

The deviation for C from G is the sum of all the deviations of all the assignment ranges in C from G. Thus: C is coarser than G (G is finer than C) precisely when the deviation for C from G is zero.

In a further example, the following considerations are taken into account. Typically, the interval sets for a quasi-identifier are a partition of the value set of interest. As has been described previously in connection with FIG. 1, for example, P1, P2, P3 are each partitions of the interval [40, 100[, i.e. of the values that are relevant to age. A partition of a set A is a collection of subsets which are disjoint among themselves and cover (or exhaust) the set A. In some cases, however, it is possible to use interval sets which represent no partition.

For example, disjoint sets can be used which do not cover all possible values. Thus, for example, a particular medical condition may occur either among young people (e.g. 16-22 years old) or among older people (over 50, but not over 80). Instead of choosing a partition of [16, 80[, a set of relevant age groups can be chosen, for example:

$$P4 = \{[16, 18[, [18, 20[, [20, 22[, [50, 55[, 55, 60[, [60, 65[, [65, 70[, [70, 75[, [75, 80[\}.$$

Each dataset whose corresponding quasi-identifier contains a value outside this interval is eliminated (suppressed). This can be useful in particular when the proportion of suppressed datasets is not too high or the attribute does not concern an important value in terms of the secondary purposes.

To sum up, the k-anonymity is refined for a set of datasets (i.e. for a database, as described above). In many situations, however, the datasets are not available from the start, but further are added over the course of time. Since it is of great practical benefit if the values can already be used in anonymized form, even if all the values are not yet available, the above-described method provides stepwise refinement of abstractions of quasi-identifiers as the volume of data increases, such that k-anonymity is preserved and the data is released over the course of time in a more precise anonymized form, as a result of which its usability is increased yet privacy is permanently preserved.

During the refinement, an abstraction target can be taken into account which is based on a statistical analysis of expected values of the quasi-identifiers from other data sources. Stepwise refinements can be approximated to the abstraction target, a k-anonymization always being chosen which deviates as little as possible from the abstraction target.

The methods described hereintofore can be performed in an automated manner by a device, for example a computer system. FIG. 10 illustrates aspects in relation to a corresponding device 1000 for anonymizing data via generalization. The device 1000 comprises a processing device 1002, e.g. a processor, and a memory 1004. The device 1000 also comprises an interface 1006. Via the interface 1006, the device 1000 can have access to a database 1050 in which data that is to be anonymized is stored and anonymized data can be stored. The device 1000 can further comprise a computer-readable storage medium 1008, for example a hard disk drive, a random-access memory or a read-only memory in which a computer program product, for example a piece of software, is stored which comprises a computer-readable program code which is embodied to cause the processing device 1002 to perform the below-described processing steps.

The data that is to be anonymized comprises a first number of first datasets at a first time point and a second number of second datasets at a second later time point. The first datasets are a subset of the second datasets.

Processing steps of a method 1100 which are performed by the device 1000, in particular by the processing device 1002, are described below in connection with FIG. 11.

The processing device 1002 is embodied to generate a first generalization for the first datasets which fulfills a required anonymization (step 1102). The first generalization comprises a first group of assignment ranges by which values of a quasi-identifier of the data are generalized. The processing device 1002 is further embodied to generate a second generalization for the second datasets (step 1104) which fulfills the required anonymization. The second generalization comprises a second group of assignment ranges by which values of the quasi-identifier are generalized. The second group comprises more assignment ranges than the first group. Further generalizations can be performed at further time points when further datasets are available. The thus generalized datasets can be stored in the database 1050 as anonymized datasets or can be forwarded in some other way to a further database for secondary purposes (step 1106).

As described previously, the data may for example comprise patient data. For example, a service provider (e.g. a clinic) can acquire personally identifiable data about patients in order to treat the patients. This data can comprise personal data, such as name, age, address and the like, as well as health data, such as type of disease, blood values, X-ray images, etc. The service provider can then use the data in anonymized form for secondary purposes, for example for promoting clinical research, for example for clinical studies or in order to train a diagnostic system which is based on artificial intelligence or machine learning with the anonymized data. In another example, the service provider can collect data in the transportation sector in order for example to bill for parking fees, road tolls or transportation charges. This data can in turn comprise personal data, such as name, address, make and model of vehicle, distances traveled and times of journeys. In anonymized form, this data can be used for transportation planning or traffic management and control as secondary purposes. A further example relates to the electronic acquisition of data in buildings, such as in elevators or at doors, for example. For access control, this data can comprise personal data such as name, company affiliation, an image of the face, as well as typical movement patterns of the individual, e.g. movement paths and associated times. In anonymized form, this data can be used for example for optimizing an elevator controller or for planning circulation routes in buildings.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element (s) or feature (s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion.

In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/ DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A computer-implemented method for anonymizing data via generalization, the data including first datasets at a first time point and second datasets at a second time point, the first datasets being a subset of the second datasets, and the computer-implemented method comprising:
   generating a first generalization for the first datasets that satisfies an anonymization criterion, the first generalization including a first group of assignment ranges by which first values of a quasi-identifier of the data are generalized; and
   generating a second generalization for the second datasets that satisfies the anonymization criterion, the second generalization including a second group of assignment ranges by which second values of the quasi-identifier are generalized, the second group including more assignment ranges than the first group, and a value set assigned to a totality of assignment ranges of the first group being identical to a value set assigned to a totality of assignment ranges of the second group.

2. The computer-implemented method as claimed in claim 1, wherein
   each respective value of the quasi-identifier is assigned at most to one of the assignment ranges of the first group; and
   each respective value of the quasi-identifier is assigned at most to one of the assignment ranges of the second group.

3. The computer-implemented method as claimed in claim 2, wherein
   a first interval is assigned to a first assignment range among the first group of assignment ranges;
   intervals of the first group have interval lengths independent of one another; and
   a first interval length of the first interval is dependent on a number of the first datasets assigned to the first interval.

4. The computer-implemented method as claimed in claim 2, wherein
   the data includes third datasets at a third time point;
   the third datasets are a superset of preceding datasets at a preceding time point;
   the computer-implemented method further comprises generating a third generalization for the third datasets based on a preceding generalization, the preceding generalization being the second generalization or a further generalization iteratively based on the second generalization;
   the third generalization includes a third group of assignment ranges by which third values of the quasi-identifier are generalized; and
   the third group includes more assignment ranges than a preceding group of assignment ranges of the preceding generalization.

5. The computer-implemented method as claimed in claim 2, further comprising:
   determining a statistical distribution of third values of the quasi-identifier; and
   generating a target generalization based on the statistical distribution, the target generalization including a target group of assignment ranges by which the third values of the quasi-identifier of the data are generalized, wherein
      the generating the first generalization or the generating the second generalization is performed as a function of the target generalization.

6. The computer-implemented method as claimed in claim 1, wherein a value set of each among the second group of assignment ranges is a subset of a value set of one among the first group of assignment ranges.

7. The computer-implemented method as claimed in claim 1, wherein
   a first interval is assigned to a first assignment range among the first group of assignment ranges;
   intervals of the first group have interval lengths independent of one another; and
   a first interval length of the first interval is dependent on a number of the first datasets assigned to the first interval.

8. The computer-implemented method as claimed in claim 7, wherein
   the data includes third datasets at a third time point;
   the third datasets are a superset of preceding datasets at a preceding time point;
   the computer-implemented method further comprises generating a third generalization for the third datasets based on a preceding generalization, the preceding generalization being the second generalization or a further generalization iteratively based on the second generalization;
   the third generalization includes a third group of assignment ranges by which third values of the quasi-identifier are generalized; and
   the third group includes more assignment ranges than a preceding group of assignment ranges of the preceding generalization.

9. The computer-implemented method as claimed in claim 7, further comprising:
   determining a statistical distribution of third values of the quasi-identifier; and
   generating a target generalization based on the statistical distribution, the target generalization including a target group of assignment ranges by which the third values of the quasi-identifier of the data are generalized, wherein
      the generating the first generalization or the generating the second generalization is performed as a function of the target generalization.

10. The computer-implemented method as claimed in claim 1, wherein
   the data includes third datasets at a third time point;

the third datasets are a superset of preceding datasets at a preceding time point;

the computer-implemented method further comprises generating a third generalization for the third datasets based on a preceding generalization, the preceding generalization being the second generalization or a further generalization iteratively based on the second generalization;

the third generalization includes a third group of assignment ranges by which third values of the quasi-identifier are generalized; and the third group includes more assignment ranges than a preceding group of assignment ranges of the preceding generalization.

11. The computer-implemented method as claimed in claim 10, further comprising:

determining a statistical distribution of fourth values of the quasi-identifier; and generating a target generalization based on the statistical distribution, the target generalization including a target group of assignment ranges by which the fourth values of the quasi-identifier of the data are generalized, wherein the generating the first generalization or the generating the second generalization is performed as a function of the target generalization.

12. The computer-implemented method as claimed in claim 1, further comprising:

determining a statistical distribution of third values of the quasi-identifier; and generating a target generalization based on the statistical distribution, the target generalization including a target group of assignment ranges by which the third values of the quasi-identifier of the data are generalized, wherein the generating the first generalization or the generating the second generalization is performed as a function of the target generalization.

13. The computer-implemented method as claimed in claim 1, wherein each assignment range of the first group includes an at least two-dimensional assignment range by which the first values of the quasi-identifier and first values of at least one further quasi-identifier of the data are generalized; and each assignment range of the second group includes an at least two-dimensional assignment range by which the second values of the quasi-identifier and second values of the at least one further quasi-identifier are generalized.

14. The computer-implemented method as claimed in claim 13, further comprising:

determining statistical distributions of third values of the quasi-identifier and of third values of the at least one further quasi-identifier; and generating a target generalization based on the statistical distributions, the target generalization including a target group of at least two-dimensional assignment ranges by which the third values of the quasi-identifier and the third values of the at least one further quasi-identifier are generalized, wherein the generating the first generalization or the generating the second generalization is performed as a function of the target generalization.

15. A non-transitory computer program product including computer-readable program code embodied to cause a processing device to perform the method as claimed in claim 1.

16. A non-transitory computer-readable storage medium storing computer-executable instructions that, when executed by a processing device, cause the processing device to perform the method of claim 1.

17. A device for anonymizing data via generalization, the data including first datasets at a first time point and second datasets at a second time point, the first datasets being a subset of the second datasets, and the device comprising:

a processing device configured to generate a first generalization for the first datasets that satisfies an anonymization criterion, the first generalization including a first group of assignment ranges by which first values of a quasi-identifier of the data are generalized, and generate a second generalization for the second datasets that satisfies the anonymization criterion, the second generalization including a second group of assignment ranges by which second values of the quasi-identifier are generalized, the second group including more assignment ranges than the first group, and a value set assigned to a totality of assignment ranges of the first group being identical to a value set assigned to a totality of assignment ranges of the second group.

18. A computer-implemented method for anonymizing data via generalization, the data including first datasets at a first time point and second datasets at a second time point, the first datasets being a subset of the second datasets, and the computer-implemented method comprising:

generating a first generalization for the first datasets that satisfies an anonymization criterion, the first generalization including a first group of assignment ranges by which first values of a quasi-identifier of the data are generalized; and generating a second generalization for the second datasets that satisfies the anonymization criterion, the second generalization including a second group of assignment ranges by which second values of the quasi-identifier are generalized, the second group including more assignment ranges than the first group, and a value set of each among the second group of assignment ranges being a subset of a value set of one among the first group of assignment ranges.

19. The computer-implemented method as claimed in claim 18, wherein each respective value of the quasi-identifier is assigned at most to one of the assignment ranges of the first group; and each respective value of the quasi-identifier is assigned at most to one of the assignment ranges of the second group.

20. The computer-implemented method as claimed in claim 18, wherein a first interval is assigned to a first assignment range among the first group of assignment ranges;

intervals of the first group have interval lengths independent of one another; and a first interval length of the first interval is dependent on a number of the first datasets assigned to the first interval.

* * * * *